(12) United States Patent
Jiang et al.

(10) Patent No.: US 11,170,183 B2
(45) Date of Patent: Nov. 9, 2021

(54) LANGUAGE ENTITY IDENTIFICATION

(71) Applicant: INTERNATIONAL BUSINESS MACHINES CORPORATION, Armonk, NY (US)

(72) Inventors: Jian Min Jiang, Beijing (CN); Yuan Ni, Shanghai (CN); Guo Yu Tang, Beijing (CN); Shiwan Zhao, Beijing (CN); Guo Tong Xie, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

(21) Appl. No.: 16/132,687

(22) Filed: Sep. 17, 2018

(65) Prior Publication Data
US 2020/0089775 A1 Mar. 19, 2020

(51) Int. Cl.
G06F 40/53 (2020.01)
G06K 9/34 (2006.01)
G06F 40/295 (2020.01)

(52) U.S. Cl.
CPC ............ G06F 40/53 (2020.01); G06F 40/295 (2020.01); G06K 9/344 (2013.01)

(58) Field of Classification Search
CPC ........ G06F 40/53; G06F 40/295; G06K 9/344
See application file for complete search history.

(56) References Cited

U.S. PATENT DOCUMENTS 6,562,078 B1 * 5/2003 Yang .................. G06F 3/018
341/23
7,853,444 B2 12/2010 Wang et al.
9,384,191 B2 7/2016 Barrett et al.
2008/0077588 A1 * 3/2008 Zhang .................. G06Q 30/00
2016/0019201 A1 * 1/2016 Qian ..................... G06F 40/274
704/9

FOREIGN PATENT DOCUMENTS

CN 101788978 B 12/2011

OTHER PUBLICATIONS

DaCiDian Github Project repository, 662cbe52a6 Branch dated Apr. 14, 2018, available at https://github.com/aishell-foundation/DaCiDian/tree/662cbe52a6688647094ed0b7871a334f0e6cb7a1. (Year: 2018).*
Wang et al., "Multiple Character Embeddings for Chinese Word Segmentation," arXiv:1808.04963v1 [cs.CL], 10 pages, Aug. 15, 2018. (Year: 2018).*

(Continued)

*Primary Examiner* — Michelle M Koeth
(74) *Attorney, Agent, or Firm* — Tutunjian & Bitetto, P.C.; Joseph Petrokaitis

(57) ABSTRACT

Methods, systems, and computer program products are provided for language entity identification. In one embodiment, a computer-implemented method is disclosed. In the method, respective pinyin codes may be determined for respective Chinese characters comprised in a string that is to be processed. Then, respective pinyin features may be generated from the respective pinyin codes. Next, a candidate language entity may be identified from the string based on the respective pinyin features and a mapping describing an association between pinyin features and language entity. In other embodiments, a computer-implemented system and a computer program product for security management are disclosed.

18 Claims, 7 Drawing Sheets

(56) References Cited

OTHER PUBLICATIONS

Zhang et al., "While Encoding is the Best for Text Classification in Chinese, English, Japanese and Korean?" arXiv:1708.02657v2 [cs.CL], 24 pages, Aug. 17, 2017. (Year: 2017).*

Wang et al., "Multi-Embedding-CWS," Github Repository, (selected portions) May 2018, the entire repository is available at https://github.com/wangjksjtu/multi-embedding-cws, last accesed May 18, 2020. (Year: 2018).*

Zhao et al., "Unsupervised Segmentation Helps Supervised Learning of Character Tagging for Word Segmentation and Named Entity Recognition," Proc. of the Sixth SIGHAN Workshop on Chinese Language Proc., pp. 106-111 (available at https://www.aclweb.org/anthology/I08-4017.pdf, last accessed May 18, 2020 (Year: 2008).*

Yuan et al., "A Neural Network for Disambiguating Pinyin Chinese Input," Proceedings of the CALICO '94 Annual Symposium, Mar. 14-18, 1994, Northern Arizona University (Year: 1994).*

Xianyun, "Chinese Pinyin Conversion Tool (Python Version)—pypinyin 0.31.0 documentation," Jul. 11, 2018, [http://pypinyin.readthedocs.io/zh_CN/master/]_Internet Archive_ [http://web.archive.org/web/20180711063235/http://pypinyin.readthedocs.io/zh_CN/master/]. (Chrome Machine English Translation). (Year: 2018).*

Xianyun, "Usage—pypinyin 0.31.0 documentation," Jul. 11, 2018, [http://pypinyin.readthedocs.io/zh_CN/master/usage.html]_Internet Archive_ [http://web.archive.org/web/20180711063235/http://pypinyin.readthedocs.io/zh_CN/master/usage.html] (Chrome Machine English translation). (Year: 2018).*

Gao, W. et al., "Improving Transliteration with Precise Alignment of Phoneme Chunks and Using Contextual Features" AIRS 2004: Information Retrieval Technology (Oct. 2004) pp. 106-117.

* cited by examiner

800A

| CHINESE ENTITIES | PINYIN FEATURES |
|---|---|
| 双氯芬酸钠 | SHUANG... |
| 双氯氛酸钠 | SHUANG... |
| 双氯酚酸钠 | SHUANG... |
| 埃菲尔 | AI... |
| 艾菲尔 | AI... |
| 马克思 | MA... |
| 马科斯 | MA... |
| ... | ... |

810A (highlighting row: 双氯芬酸钠 / SHUANG...)

| CHINESE ENTITIES | FEATURES | NAME TYPES |
|---|---|---|
| 双氯芬酸钠 | SHUANG... | DRUG NAME |
| 双氯氛酸钠 | SHUANG... | DRUG NAME |
| 双氯酚酸钠 | SHUANG... | DRUG NAME |
| 埃菲尔 | AI... | PLACE NAME |
| 艾菲尔 | AI... | PLACE NAME |
| 马克思 | MA... | PERSON NAME |
| 马科斯 | MA... | PERSON NAME |
| ... | ... | ... |

810B (highlighting row: 双氯芬酸钠 / SHUANG... / DRUG NAME)
820B (highlighting row: 埃菲尔 / AI... / PLACE NAME)

FIG. 8B

LANGUAGE ENTITY IDENTIFICATION

BACKGROUND

Technical Field

The present embodiment generally relates to language entity identification. Specifically, the present embodiment relates to computer-implemented methods, computer-implemented systems and computer program products for identifying a Chinese language entity (such as a Chinese word, a phase, and the like) from a string comprising multiple Chinese characters.

Related Art

With the development of machine learning technology, machine learning solutions have been widely applied to identify semantic meanings of an article. For different languages, different features can be used to describe text elements comprised in the article. Since Chinese text may comprise a plurality of Chinese characters and it is difficult to determine boundaries between individual Chinese characters comprised in a meaningful language entity. Therefore, identifying language entities are faced with more difficulties.

SUMMARY

In one aspect, a computer-implemented method is disclosed. According to the method, respective pinyin codes may be determined for respective Chinese characters comprised in a string that is to be processed. Then, respective pinyin features may be generated from the respective pinyin codes. Next, a candidate language entity may be identified from the string based on the respective pinyin features and a mapping describing an association between pinyin features and language entities.

In another aspect, a computer-implemented system is disclosed. The computing system comprises a computer processor coupled to a computer-readable memory unit, where the memory unit comprises instructions that when executed by the computer processor implements a method. According to the method, respective pinyin codes may be determined for respective Chinese characters comprised in a string that is to be processed. Then, respective pinyin features may be generated from the respective pinyin codes. Next, a candidate language entity may be identified from the string based on the respective pinyin features and a mapping describing an association between pinyin features and language entities.

In another aspect, a computer program product is disclosed. The computer program product comprises a computer readable storage medium having program instructions embodied therewith. The program instructions are executable by an electronic device to cause the electronic device to perform actions of: determining respective pinyin codes for respective Chinese characters comprised in a string that is to be processed; generating respective pinyin features from the respective pinyin codes; and identifying a candidate language entity from the string based on the respective pinyin features and a mapping describing an association between pinyin features and language entities.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present embodiment in the accompanying drawings, the above and other objects, features and advantages of the present embodiment will become more apparent, wherein the same reference generally refers to the same components in the embodiments of the present embodiment.

FIGS. 8A and 8B depict example diagrams of sample language entities for training a mapping describing an association between pinyin features and language entities according to an embodiment of the present invention.

Throughout the drawings, same or similar reference numerals represent the same or similar elements.

DETAILED DESCRIPTION

Figure 1:
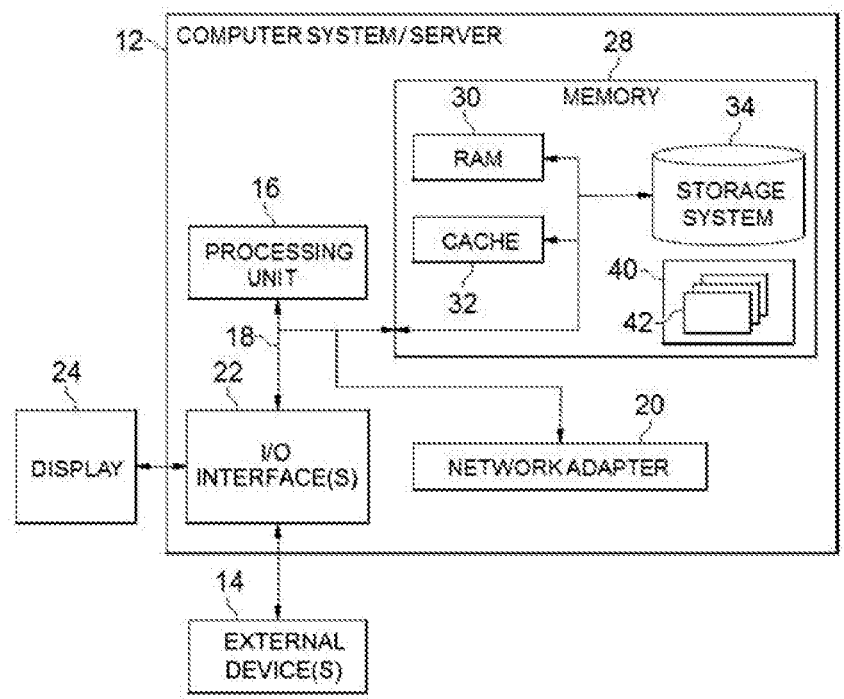
FIG. 1 depicts a cloud computing node according to an embodiment of the present invention.

Some embodiments will be described in more detail with reference to the accompanying drawings, in which the embodiments of the present embodiment have been illustrated. However, the present embodiment can be implemented in various manners, and thus should not be construed to be limited to the embodiments disclosed herein.

It is understood in advance that although this embodiment includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node, there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 can include a variety of computer system readable media. Such media may be any available media that is accessible by computer system/server 12, and it can include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
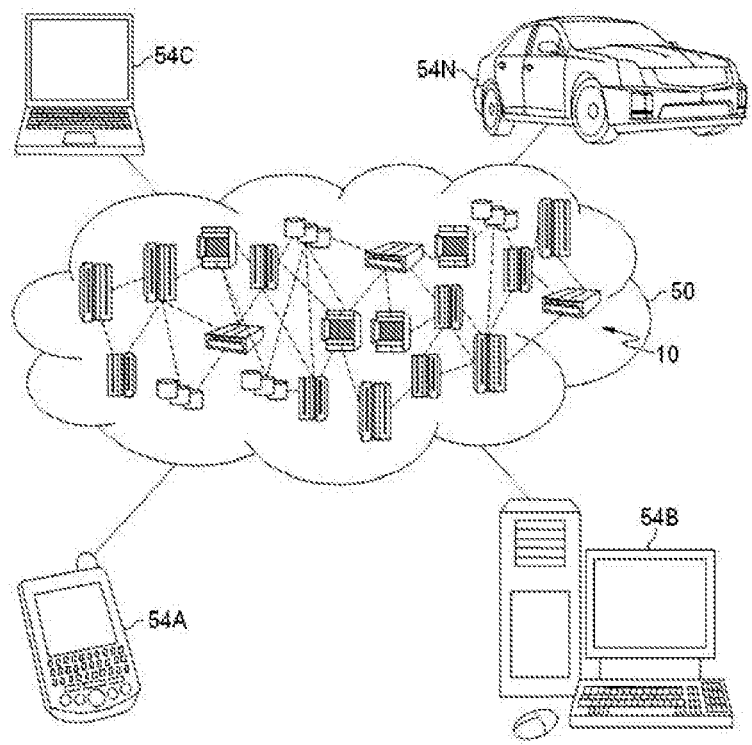
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
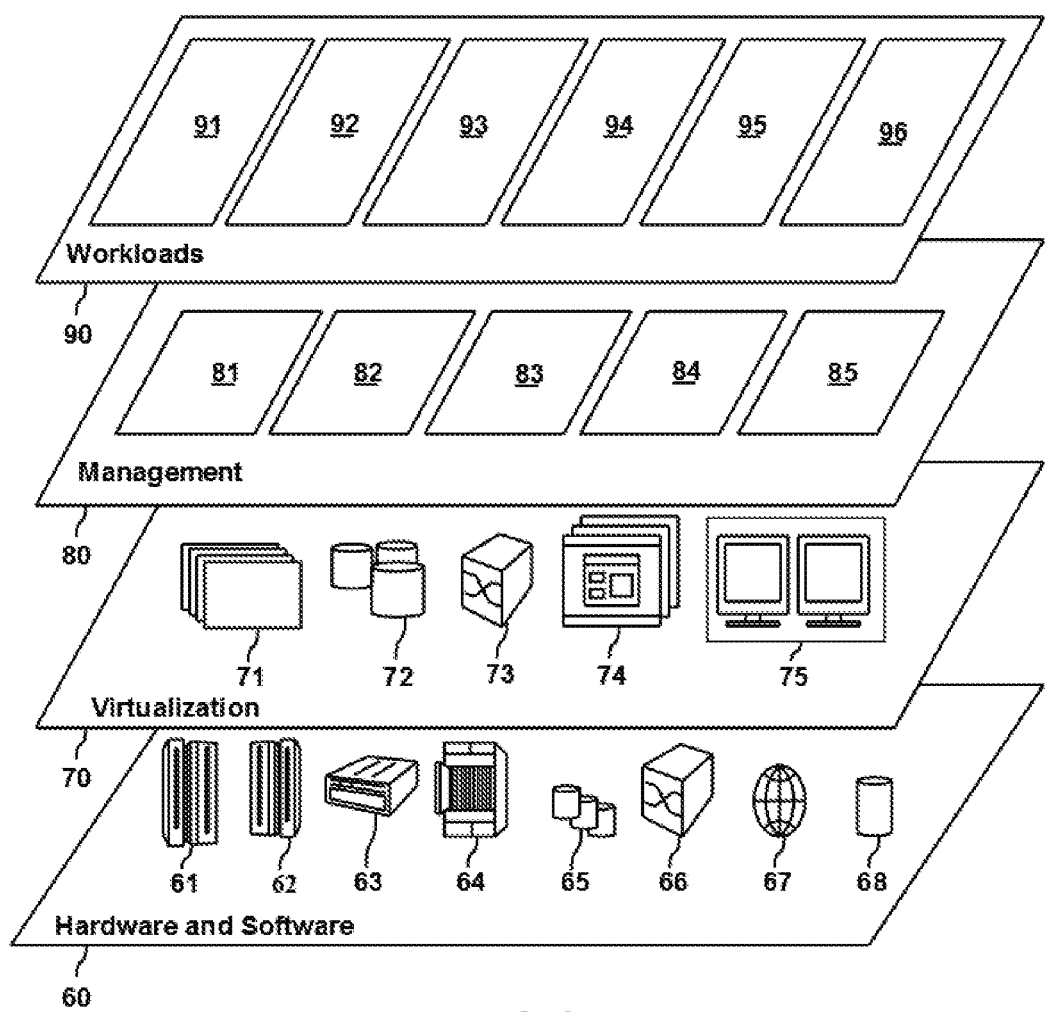
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identification processing 96. Identification processing 96 can be provided as an online service to provide more accurate naming and naming standards to users. In addition, a stand-alone identification processing device can be provided having dedicated circuits and features for identification processing 96. In another embodiment, a handheld communication device or computer (e.g., 54A in FIG. 2) can be employed to provide identification processing 96 in accordance with the present embodiments. Hereinafter, reference will be made to FIG. 4 to FIG. 9 to describe details of the identification processing 96.

Figure 4:
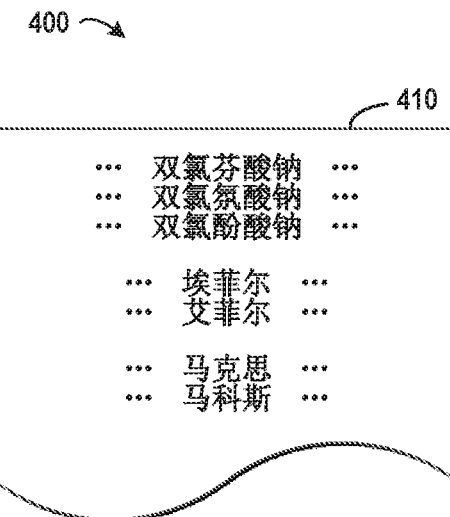
FIG. 4 depicts an example diagram of an article including strings that are to be processed according to an embodiment of the present invention.

The Chinese language is expressed in Chinese characters, and there may be situations where the Chinese characters in two language entities are different but the two words indicate the same meaning. FIG. 4 depicts an example diagram 400 of an article 410 including strings that are to be processed according to an embodiment of the present invention. In FIG. 4, the article 410 may include multiple strings such as sentences. Here, in each of these strings, there may be a plurality of Chinese characters such as "双", "氯", "芬", "酸", "钠", and "双", "氯", "氖", "酸", "钠". It is to be understood that lots of language entities are translated from foreign languages. Taking article 410 as an example, both of "双氯芬酸钠" and "双氯氖酸钠" are translated from the English word "diclofenac sodium". Although the "芬" and "氖" are different as individual Chinese characters, meanings of the character sequences "双氯芬酸钠" and "双氯氖酸钠" are the same. FIG. 4 also shows other examples, where both of "埃菲尔" and "艾菲尔" are translated from the French famous "Eiffel" tower, and both of "马克思" and "马科斯" are borrowed from the English name "Marx".

Traditionally, machine learning solutions are solely based on the features of the Chinese character itself, and thus "芬" and "氖" may be treated as totally different Chinese characters. Therefore, the traditional solutions lead to difficulties in identifying the situation where multiple character sequences indicate the same meaning. On one hand, it is a time-consuming procedure to train the machine learning model based on which language entities may be identified. On the other hand, identification results are not accurate enough because the character sequences indicating the same meaning are identified as different language entities.

In order to at least partially solve the above and other potential problems, a new method for identifying a language entity based on Hanyu Pinyin (汉语拼音 Romanization is disclosed according to embodiments of the present invention. Hanyu Pinyin Romanization, often abbreviated to pinyin, is the official romanization system for Standard Chinese in mainland China and to some extent in Taiwan.

For the sake of description, embodiments of the present invention will be described in an environment where a language entity is identified from a string including multiple Chinese characters. Here, the string may be a sentence in an article, a portion of a sentence, a phase, or even a word in Chinese. When two character sequences with different Chinese characters indicate the same meaning, usually the two character sequences may have Homophone. In other words, characters in the two character sequences may have a same or similar pronunciations and thus have the same or similar pinyin codes. With the above embodiments, the pinyin codes of the Chinese characters are utilized to identify candidate language entities from the string, therefore it may be easier to identify the words including different characters but having the same meaning.

Figure 5:
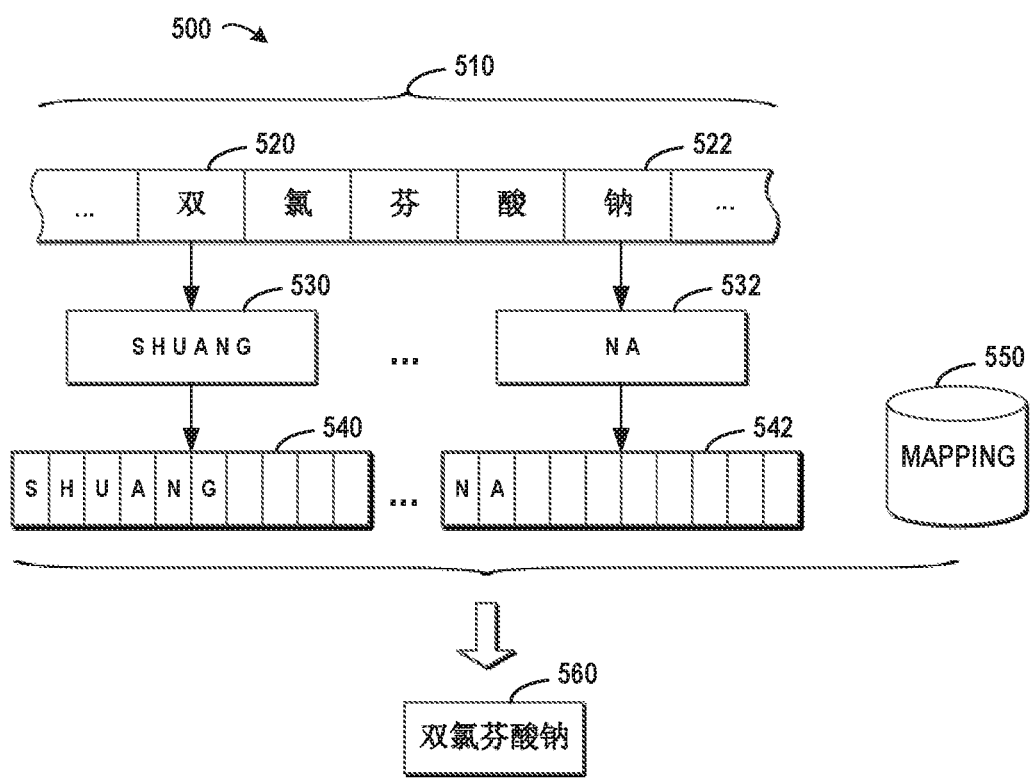
FIG. 5 depicts an example diagram for identifying a language entity from a string according to an embodiment of the present invention.

Hereinafter, reference will be made to FIG. 5 for a general description of embodiments of the present invention. FIG. 5 depicts an example diagram 500 for identifying a candidate language entity 560 from a string 510 according to an embodiment of the present invention. In FIG. 5, the string 510 may comprise multiple Chinese characters, such as "双 (indicated by a reference number 520)", "氯", "芬", "酸", and "钠 (indicated by a reference number 522)". From each of these Chinese characters, a pinyin code may be determined. Taking the Chinese character "双" 520 as an example, the pinyin code "shuang" 530 may be determined. Then, a pinyin feature 540 may be determined from the pinyin code 530. Similar procedures may be performed to the other Chinese characters "氯", "芬", "酸", and "钠". For the Chinese character "钠" 522, the pinyin code may be determined as "na" 532, and then a pinyin feature 542 may be generated based on "na".

Figure 6:
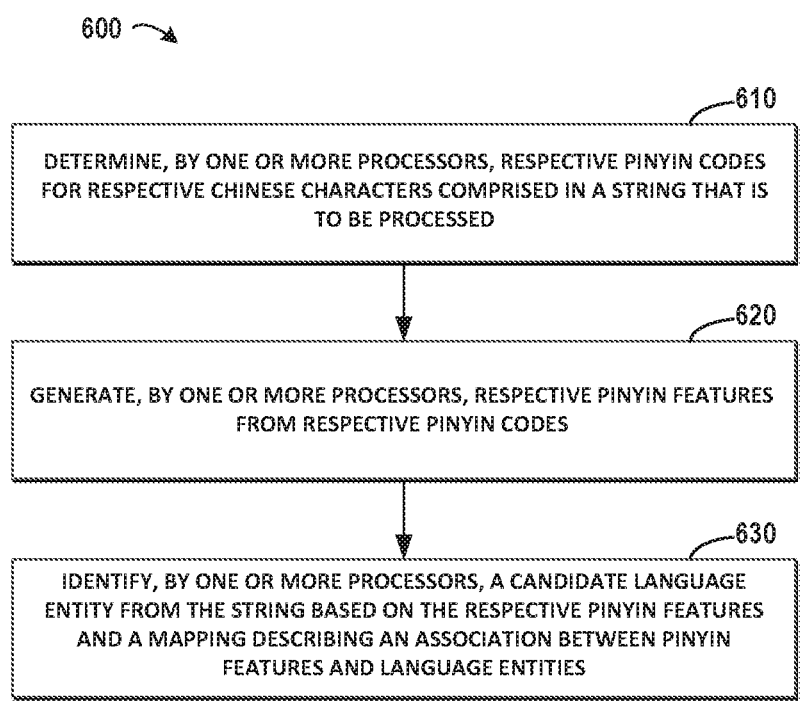
FIG. 6 depicts an example flowchart of a method for identifying a language entity from a string according to an embodiment of the present invention.

In FIG. 5, a mapping 550 may be obtained in advance, here the mapping 550 may describe an association between pinyin features and language entities. In an embodiment of the present invention, the mapping 550 may be trained based on sample pinyin features and sample language entities. In this embodiment, when the pinyin features 540, . . . , 542 are inputted, a candidate language entity "双氯芬酸钠" 560 may be identified based on the mapping 550. Reference will be made to FIG. 6 for details about how to identify the candidate language entity 560 from the string 510.

FIG. 6 depicts an example flowchart of a method 600 for identifying a language entity 560 from a string 510 according to an embodiment of the present invention. At a block 610, respective pinyin codes may be determined for respective Chinese characters comprised in a string that is to be processed. Here, based on the rules of pinyin, a pinyin code may be determined for one Chinese character, and the pinyin codes for each Chinese character the string 510 may be illustrated in Table 1 as below.

TABLE 1

| Example of Pinyin Codes | |
| --- | --- |
| Chinese Character | Pinyin Code |
| . . . | . . . |
| 双 | shuang |
| 氯 | lv |
| 芬 | fen |
| 酸 | suan |
| 钠 | na |
| . . . | . . . |

At a block 620, respective pinyin features may be generated from the respective pinyin codes. Here, the pinyin feature may be defined as a vector with a predefined length. According to embodiments of the present invention, in order to normalize the pinyin codes to a uniform length, a predefined length for generating a pinyin feature from the pinyin code may be obtained. Then the pinyin feature may be generated based on at least one padding symbol and the pinyin code if a length of the pinyin code being below the predefined length. With the above embodiments, the pinyin features for various Chinese characters may be normalized to a uniform format, and thus the further processing may be based on a uniform standard, which may increase the accuracy in identifying and transforming the candidate language entity.

In the embodiment of FIG. 5, the length may be configured to 10, therefore the six letters "shuang" in the pinyin code 530 may be fitted into the first six dimensions of the vector, and the remaining of the dimensions may be filled with padding symbols such as the space symbol " ". At this point, the pinyin feature 540 for the Chinese character 520 may be represented as "shuang", here "shuang" is followed by four space characters. For the Chinese character "钠" 522, the corresponding pinyin feature 542 may be determined as "na", where "na" is followed by eight space symbols. Although the above paragraph describes the padding symbol as the space symbol, in another embodiment, the padding symbol may be represented by other symbols such as "*", "#", "@" or the like.

Although the above paragraph describes examples where the padding symbols are appended to the end of the pinyin code, in another embodiment, the padding symbols may be inserted at the beginning of the pinyin code. For example, the pinyin feature 540 may be represented as "Shuang", where the four space symbols locate at the head of the pinyin feature 540. In another embodiment, the padding symbols may be added at both ends of the pinyin code. In this situation, the pinyin feature 540 may be "shuang". Alternatively, other rules may be defined about how to generate the pinyin feature based on the padding symbols and the pinyin code. It is to be understood that, once the rule is defined, all the Chinese characters should follow the same rule, such that all the pinyin features are generated according to a uniform rule.

Although language entities are illustrated as Chinese words in the above implementation, in another implementation, the language entity may be a Chinese phase or another meaningful linguistic unit. For example, the language entity may includes "双氯芬酸钠注射液", "埃菲尔铁塔" and the like. Moreover, the language entity may include a combination of words such as "卡尔·马克思". At this point, the separator "·" between the two words may be directly inserted between the pinyin codes of the two words during determination of the pinyin feature 540. Alternatively, the separator may be represented by a predefined character.

According to embodiments of the present invention, each of the Chinese characters in the string 510 may be processed in a similar manner so as to determine the pinyin codes for all the characters in the string 510. Hereinafter, reference will be made to FIGS. 7A-7D for describing how to generate the pinyin feature.

Figure 7A:
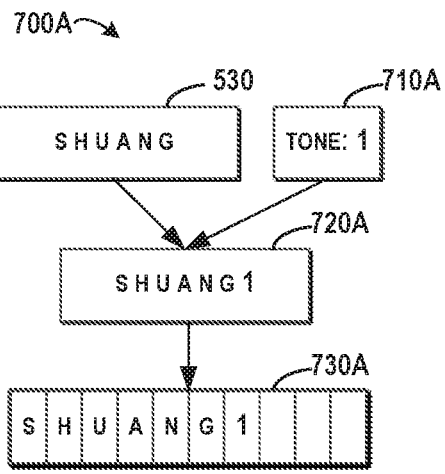
FIGS. 7A, 7B, 7C and 7D depict example diagrams for generating pinyin features according to an embodiment of the present invention.

FIG. 7A depicts an example diagram 700A for generating pinyin feature 730A according to an embodiment of the present embodiment. As shown in FIG. 7A, a tone mark 710A associated with the Chinese character "双" 520 may be determined, and then the pinyin code 530 for the Chinese character "双" 520 may be updated based on the determined tone mark 710A.

It is to be understood that the pinyin system may use diacritics to mark the four tones of Mandarin. The diacritic is placed over the letter that represents the syllable nucleus. The first tone (Flat or High Level Tone) is represented by a macron (ˉ) added to the pinyin vowel. The second tone (Rising or High-Rising Tone) is denoted by an acute accent (ˊ). The third tone (Falling-Rising or Low Tone) is marked by a symbol (ˇ). Further, the fourth tone (Falling or High-Falling Tone) is represented by a grave accent (ˋ).

Here, the four tones may be represented by the numbers 1, 2, 3 and 4, respectively. As the Chinese character "双" has the first tone, the tone mark 710A (represented by the number "1") may be appended at the end of the pinyin code 530 to form the updated pinyin code 720A. As the tone mark 710A may reflect the tone of the Chinese character, information about the tone mark 710A may be added into the pinyin code 530 to form an updated pinyin code 720A, and then the pinyin feature 730A may be represented as "shuang1". In this way, the pinyin feature for the Chinese character may be represented in a more accurate manner and thus the further identification may be more reliable.

Although the above illustrates that the tone mark 710A is appended at the end of the pinyin code 530, in another embodiment, the tone mark 710A may be added into another position in the pinyin code 530. Further, although the above paragraph describes how to generate the pinyin feature based on the tone mark represented by the numbers, in other embodiments of the present invention, other symbols or numbers may be utilized to represent the tone mark 710A. For example, the numbers "0", "1", "2", "3", or symbols "ˉ", "ˊ", "ˇ", and "ˋ" may be selected to represent the four tones, respectively.

Figure 7B:
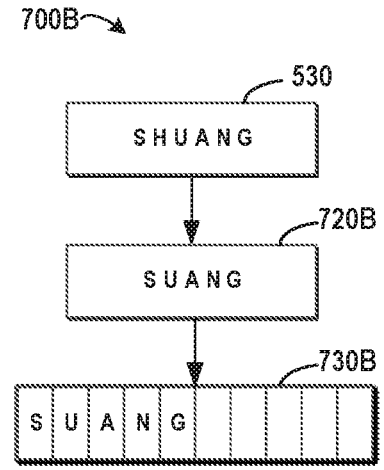
Figure 7C:
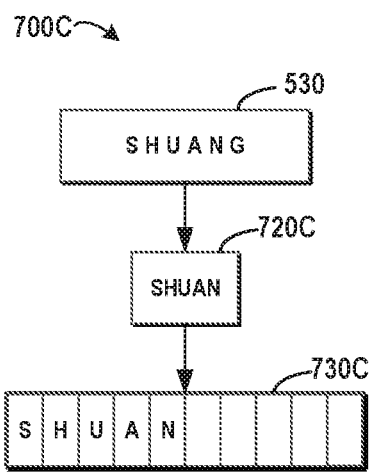

Generally speaking, the pinyin code may comprise two portions: an initial (shengmu, 声母) portion and final (yunmu, 韵母) portions, and the pinyin code may be spelled with exactly one initial followed by one final. Most initials contain a consonant, while finals are not always simple vowels, especially for compound finals (fuyunmu, 复韵母). For the Chinese character "钠" 522, the pinyin code 532 may include an initial portion "n" and a final portion "a". For the Chinese character "双" 530, the pinyin code 530 may include an initial portion "sh" and a compound final portion "uang". Reference will be made to FIGS. 7B and 7C to describe how to generate pinyin features based on initial and final portions in the pinyin codes.

FIG. 7B depicts an example diagram 700B for generating pinyin feature 730B according to one embodiment of the present embodiment. In the embodiment of FIG. 7B, an initial portion may be determined in the pinyin code 530 for the Chinese character, and then the pinyin code 530 may be updated based on the determined initial portion. The pronunciations of initials "sh" and "s" are similar and sometimes some people in the southern area of China cannot tell the difference between them. Therefore, the pinyin code 530 may updated by replacing "sh" with "s" and then an updated pinyin code 720B may be formed. At this point, the pinyin feature 730B may be represented as "suang". In this way, the computing workload for further processing may be reduced, and meanwhile accuracy of the identification result may remain almost the same as before.

It is to be understood that embodiments for generating the pinyin features shown in FIGS. 7A and 7B may be combined. When both of the tone mark and the initial of the pinyin code 530 are considered, the pinyin feature 730B may be represented as "suang1".

According to embodiments of the present invention, a final portion may be determined in the pinyin code 530 for the Chinese character, and then the pinyin code 530 may be updated based on the determined final portion. FIG. 7C depicts an example diagram 700C for generating pinyin feature 730C according to one embodiment of the present embodiment. The pronunciations of the finals "uang" and "uan" are similar and sometimes some people in the southern area of China cannot tell the difference between them. Therefore, the pinyin code 530 may updated by replacing "uang" with "uan" and then an updated pinyin code 720C may be formed. Next, the pinyin feature 730C may be represented as "shuan". In this way, the computing workload for further processing may be reduced, and meanwhile accuracy of the identification result may remain almost the same as before.

It is to be understood that embodiments for generating the pinyin features shown in FIGS. 7A and 7C may be combined. When both of the tone mark and the final of the pinyin code 530 are considered, the pinyin feature 730C may be represented as "shuan1". In another embodiment, when the tone mark, the initial and the final are considered, the pinyin feature 730C may be represented as "suan1".

Figure 7D:
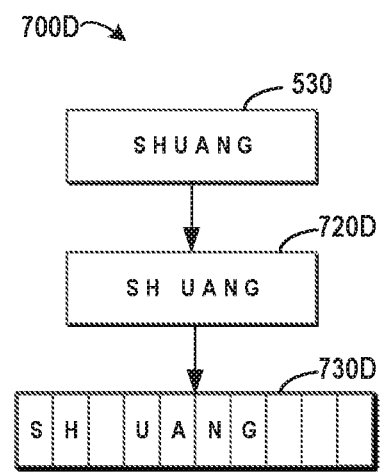

FIG. 7D depicts an example diagram 700D for generating pinyin feature 730D according to one embodiment of the present embodiment. In the above embodiment, a padding symbol may be added between the initial portion and the final portion. At this point, a space symbol may be inserted between "sh" and "uang", and the updated pinyin code 720D may be "sh uang". Further, the pinyin feature 730D may be represented as "sh uang". It is to be understood that embodiments for generating the pinyin features shown in FIGS. 7A to 7D may be combined. In one embodiment, the pinyin feature 730D may be represented as "s uan1".

In embodiments of the present invention, each of the initial and final portions may be converted into a single dimension in the pinyin feature based on a predefined function. Although the above paragraphs describe embodiments where each of the dimensions in the pinyin feature is represented as a letter, in other embodiments, each of the dimension may be represented by another data type such as an integer, a real number or another value.

Referring back to FIG. 6, at a block 630, a candidate language entity 560 may be identified from the string 510 based on the respective pinyin features 530, . . . , 532 and a mapping 550 describing an association between pinyin features and language entities. Here, the mapping 550 is generated based on historical knowledge about the association between pinyin features and language entities. The mapping 550 may show a general association and thus may facilitate in finding whether there is a candidate language entity in the string 510. Here, the mapping 550 may be defined based on machine learning solutions. It is to be understood that, the present invention does not limit details of the machine learning solution, and those skilled in the art may adopt any type of the machine learning solution. For example, a neural network may be utilized for describing the association.

According to embodiments of the present invention, the mapping 550 may be obtained in a pre-processing procedure, for example, the mapping 550 may be trained based on a plurality of sample language entities and respective pinyin features of Chinese characters included in each of the sample language entities. Details will be provided by how to train the mapping 550 based on one sample language entity, and those skilled in the art may train the mapping based on other sample language entities in a similar manner.

First, respective sample pinyin codes for respective Chinese characters comprised in the sample language entity may be determined. Reference may be made to the block 610 in FIG. 6 for details. Next, respective sample pinyin features may be generated from the respective sample pinyin codes. Here, the generation of the sample pinyin feature is similar as what is presented in the block 620 in FIG. 6. Then, the mapping 550 may be trained based on the respective sample pinyin features and the sample language entity, such that the trained mapping identifies the sample language entity.

In an embodiment, a neural network may be utilized to describe the mapping 550 between the pinyin features and the language entities. At this point, any solutions for training the neural network may be adopted in the training the mapping 550 into a knowledge model, as long as the trained mapping may identify the sample language entity when the sample pinyin features is inputted into the trained mapping. FIG. 8A depicts example diagram 800A of sample language entities for training a mapping describing an association between pinyin features and language entities according to an embodiment of the present invention.

The first column "Chinese entities" indicates a sequence of characters that has already been confirmed that Chinese characters in the sequence form a meaningful language entity. The second column "Pinyin Features" indicates the pinyin features for the language entity specified in the first column, and it may be determined from the respective pinyin features for the respective Chinese characters comprised in the language entity. In one example, the respective pinyin features for the respective Chinese characters may be joined to form the pinyin features in the second column. At this point, the pinyin features for "双氯芬酸钠" as indicated by a reference number 810A may be:

"shuang lv ben suan na"

As shown in FIG. 8A, the language entities "双氯芬酸钠", "双氯氣酸钠", and "双氯酚酸 钠" have the same pinyin codes, therefore the pinyin features for the above three language entities are the same. With the above embodiment, by training the mapping 550 with the language entities shown in FIG. 8A, if any of the language entities in FIG. 8A occurs in the strings, the language entity will be identified from the string 550. Therefore, the situation where different Chinese character sequences indicating a same meaning may be detected and all the sequences may be found from the string 510.

According to embodiments of the present invention, a sample language entity that is translated from a foreign language may be selected for training the mapping 550. Usually, the language entities translated from foreign languages have the same or similar pronunciations. For example, the language entities "埃菲尔" and "艾菲尔" have the same pronunciations, therefore their respective pinyin codes and pinyin features are the same. Accordingly, the embodiment may be especially effective for identifying the language entities borrowed from foreign languages.

According to embodiments of the present invention, in order to increase the granularity level of the identification, the sample language entities may be labeled with a name type. At this point, the mapping may be trained based on the sample pinyin features, the language entities, as well as the name type of the sample language entities. Here, any solutions for training the neural network may be adopted in the training the mapping into a knowledge model, as long as the trained mapping may identify the sample language entity as the name type when the sample pinyin features is inputted into the trained mapping. Here, the name type being selected from any of a name of a person, a name of place, and a name of a drug, and reference will be made to FIG. 8B for details.

FIG. 8B depicts an example diagram 800B of sample language entities for training a mapping describing an association between pinyin features and language entities according to an embodiment of the present invention. In FIG. 8B, the first and second columns are the same as those in FIG. 8A. In addition, the diagram 800B further comprises a third column "Name Type" indicating a type to which the language entity belongs. For example, the language entity "双氯芬酸钠" indicated by a reference number 810B is labeled as "Drug Name", and the language entity "埃菲尔" indicated by a reference number 820B is labeled as "Place Name".

Figure 9:
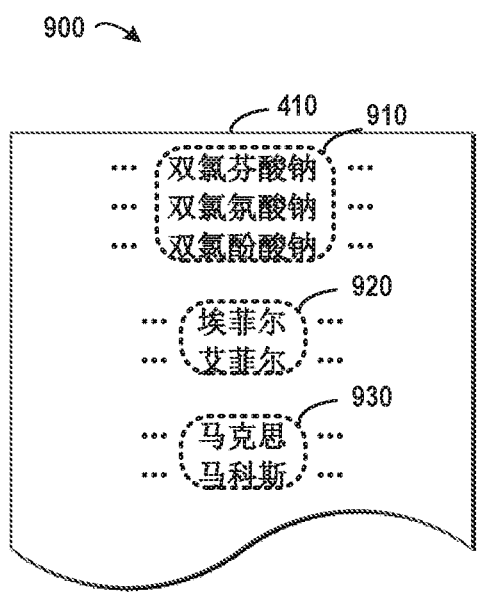
FIG. 9 depicts an example diagram of candidate language entities being identified from the article of FIG. 4 according to an embodiment of the present invention.

According to embodiments of the present invention, a candidate name type associated with the candidate language entity may be provided. With these embodiments, more information may be identified from the string. With the above embodiment, by training the mapping 550 with the language entities shown in FIG. 8B, if any of the language entities in FIG. 8B occurs in the strings, the language entity will be identified from the string 550, and further a name type associated with the language entity may be provided. Reference will be made to FIG. 9 to describe a result for identifying FIG. 9 depicts an example diagram 900 of candidate language entities being identified in the article 410 of FIG. 4 to be accurately transformed to speech or text, e.g., in another language, according to an embodiment of the present invention. As mentioned before, the article 410 may comprise multiple strings, and each of the strings may be processed according to the method 400 of the present invention. A plurality of candidate language entities may be identified from the article 410. In FIG. 9, candidate language entities "双氯芬酸钠", "双氯氛酸钠", and "双氯酚酸钠" (indicated by a reference number 910) may be identified, and meanwhile a type name may be also provided to show that these words belong to a type of drug name.

Further, candidate language entities "埃菲尔" and "艾菲尔" (indicated by a reference number 920) may be identified, and meanwhile a type name may be also provided to show that these words belong to a type of place name. As shown by a reference number 930, candidate language entities "马克思" and "马科斯" may be identified, and meanwhile a type name may be also provided to show that these candidate language entities belong to a type of person name. With the above embodiments, candidate language entities may be identified from the article 410 in a quick and accurate manner. In accordance with the present embodiments, different features can be used to describe text elements comprised in an article. Since Chinese text may comprise a plurality of Chinese characters, pinyin are employed to transform to text or speech in a same language or in a different language. The meaning of the Chinese characters can be more accurately expressed by more accurately determining boundaries between individual Chinese characters comprised in a meaningful language entity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable cable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by one or more processors, respective pinyin codes for respective Chinese characters comprised in a string that is to be processed, the pinyin codes including an initial portion and a final portion;
   generating, by the one or more processors, respective pinyin features from the respective pinyin codes, the pinyin features including the initial portion, the final portion, and tone marks associated with the Chinese characters; and
   identifying, by the one or more processors, a candidate language entity representing a word from the string based on the respective pinyin features and a mapping, stored in computer memory, describing an association between pinyin features and language entities, the candidate language entity being a homophone of another language entity representing the word,
   wherein the determination of respective pinyin codes further comprises:
   with respect to a Chinese character comprised in the string, determining, by the one or more processors, the initial portion in a pinyin code for the Chinese character;
   replacing, by the one or more processors, the initial portion with an updated initial portion that has a similar pronunciation as the initial portion; and
   updating, by the one or more processors, the pinyin code based on the updated initial portion.

2. The computer-implemented method of claim 1, wherein the determination of respective pinyin codes further comprises:
   with respect to a Chinese character comprised in the string, determining, by the one or more processors, the tone mark associated with the Chinese character; and
   updating, by the one or more processors, the pinyin code for the Chinese character based on the determined tone mark.

3. The computer-implemented method of claim 1, wherein the determination of respective pinyin codes further comprises:
   with respect to a Chinese character comprised in the string, determining, by the one or more processors, the final portion in a pinyin code for the Chinese character; and
   replacing, by the one or more processors, the final portion with an updated final portion that has a similar pronunciation as the final portion;
   updating, by the one or more processors, the pinyin code based on the updated final portion.

4. The computer-implemented method of claim 1, wherein the generation of the respective pinyin features comprises:
   with respect to a pinyin code, obtaining, by the one or more processors, a predefined length for generating a pinyin feature from the pinyin code;
   generating, by the one or more processors, the pinyin feature based on at least one padding symbol and the pinyin code in response to a length of the pinyin code being below the predefined length.

5. The computer-implemented method of claim 1, further comprising:
   obtaining, by the one or more processors, a plurality of sample language entities;
   with respect to one of the plurality of sample language entities, determining, by the one or more processors, respective sample pinyin codes for respective Chinese characters comprised in the sample language entity;
   generating, by the one or more processors, respective sample pinyin features from the respective sample pinyin codes; and
   training, by the one or more processors, the mapping based on the respective sample pinyin features and the sample language entity, such that the trained mapping identifies the sample language entity.

6. The computer-implemented method of claim 5, wherein one of the sample language entities is labeled with a name type, and the training of the mapping further comprises training, by the one or more processors, the mapping based on the name type, such that the trained mapping identifies the sample language entity as the name type.

7. The computer-implemented method of claim 6, further comprising providing, by the one or more processors, a candidate name type associated with the candidate language entity.

8. The computer-implemented method of claim 6, wherein the obtaining of the plurality of sample language entities comprises selecting a sample language entity that is translated from another language, and wherein the name type comprises at least one of: a name of a person, a name of place, and a name of a drug.

9. A computer-implemented system comprising one or more processors coupled to a computer-readable memory unit, the memory unit comprising instructions that when executed by the computer processor implements a method comprising:

determining, by the one or more processors, respective pinyin codes for respective Chinese characters comprised in a string that is to be processed, the pinyin codes including an initial portion and a final portion;

generating, by the one or more processors, respective pinyin features from the respective pinyin codes, the pinyin features including the initial portion, the final portion, and tone marks associated with the Chinese characters; and identifying, by the one or more processors, a candidate language entity representing a word from the string based on the respective pinyin features and a mapping, stored in computer memory, describing an association between pinyin features and language entities, the candidate language entity being a homophone of another language entity representing the word, wherein the determination of respective pinyin codes further comprises:

with respect to a Chinese character comprised in the string, determining, by the one or more processors, the initial portion in a pinyin code for the Chinese character;

replacing, by the one or more processors, the initial portion with an updated initial portion that has a similar pronunciation as the initial portion; and updating, by the one or more processors, the pinyin code based on the updated initial portion.

10. The computer-implemented system of claim 9, wherein the determination of respective pinyin codes further comprises: with respect to a Chinese character comprised in the string, determining, by the one or more processors, the tone mark associated with the Chinese character; and updating, by the one or more processors, the pinyin code for the Chinese character based on the determined tone mark.

11. The computer-implemented system of claim 9, wherein the determination of respective pinyin codes further comprises: with respect to a Chinese character comprised in the string, determining, by the one or more processors, a final portion in a pinyin code for the Chinese character; and updating, by the one or more processors, the pinyin code based on the determined final portion.

12. The computer-implemented system of claim 9, wherein the generation of the respective pinyin features comprises:

with respect to a pinyin code, obtaining, by the one or more processors, a predefined length for generating a pinyin feature from the pinyin code;

generating, the by one or more processors, the pinyin feature based on at least one padding symbol and the pinyin code in response to a length of the pinyin code being below the predefined length.

13. The computer-implemented system of claim 9, further comprising:

obtaining, by the one or more processors, a plurality of sample language entities;

with respect to one of the plurality of sample language entities, determining, by the one or more processors, respective sample pinyin codes for respective Chinese characters comprised in the sample language entity;

generating, by the one or more processors, respective sample pinyin features from the respective sample pinyin codes; and training, by the one or more processors, the mapping based on the respective sample pinyin features and the sample language entity, such that the trained mapping identifies the sample language entity.

14. The computer-implemented system of claim 13, wherein one of the sample language entities is labeled with a name type, and the training of the mapping further comprises training, by the one or more processors, the mapping based on the name type, such that the trained mapping identifies the sample language entity as the name type.

15. The computer-implemented system of claim 14, further comprising providing, by the one or more processors, a candidate name type associated with the candidate language entity.

16. The computer-implemented system of claim 14, wherein the obtaining of the plurality of sample language entities comprises selecting a sample language entity that is translated from another language, and wherein the name type comprises at least one of: a name of a person, a name of place, and a name of a drug.

17. A computer program product, the computer program product comprising a computer readable storage medium having program instructions embodied therewith, the program instructions executable by an electronic device to cause the electronic device to perform actions of:

determining respective pinyin codes for respective Chinese characters comprised in a string that is to be processed, the pinyin codes including an initial portion and a final portion;

generating respective pinyin features from the respective pinyin codes, the pinyin features including the initial portion, the final portion, and tone marks associated with the Chinese characters; and identifying a candidate language entity representing a word from the string based on the respective pinyin features and a mapping, stored in computer memory, describing an association between pinyin features and language entities, the candidate language entity being a homophone of another language entity representing the word, wherein the determination of respective pinyin codes further comprises:

with respect to a Chinese character comprised in the string, determining, by the one or more processors, the initial portion in a pinyin code for the Chinese character;

replacing, by the one or more processors, the initial portion with an updated initial portion that has a similar pronunciation as the initial portion; and updating, by the one or more processors, the pinyin code based on the updated initial portion.

18. The computer program product, as recited in claim 17 wherein the actions further comprise:

obtaining a plurality of sample language entities;

with respect to one of the plurality of sample language entities, determining respective sample pinyin codes for respective Chinese characters comprised in the sample language entity;

generating respective sample pinyin features from the respective sample pinyin codes; and training the mapping based on the respective sample pinyin features and the sample language entity, such that the trained mapping identifies the sample language entity.

\* \* \* \* \*